United States Patent [19]

Mears

[11] 3,889,042

[45] June 10, 1975

[54] METHOD AND APPARATUS FOR COOLING AND INSULATING ELECTRICAL EQUIPMENT

[75] Inventor: Whitney H. Mears, Buffalo, N.Y.

[73] Assignee: Allied Chemical Corporation, New York

[22] Filed: Dec. 10, 1973

[21] Appl. No.: 423,614

Related U.S. Application Data

[63] Continuation-in-part of Ser. No. 318,301, Dec. 26, 1972, abandoned, which is a continuation-in-part of Ser. No. 60,680, Aug. 3, 1970, abandoned.

[52] U.S. Cl................. 174/15 R; 34/57 A; 165/104
[51] Int. Cl. ............................................ H01b 7/34
[58] Field of Search........... 174/15 R, 52 PE, 17 SF, 174/16 R, 116, 111, DIG. 5; 165/1, 104; 161/DIG. 5, 162, 189; 336/55, 57, 58; 34/57 A

[56] References Cited
UNITED STATES PATENTS

| | | | |
|---|---|---|---|
| 2,359,310 | 10/1944 | Hemminger | 34/57 A X |
| 2,702,742 | 2/1955 | Hillard, Jr. | 34/57 A X |
| 2,990,443 | 6/1961 | Camilli | 174/15 R |
| 3,075,580 | 1/1963 | Davis, Jr. | 165/1 |
| 3,118,773 | 1/1964 | Bennett et al. | 165/104 X R |
| 3,239,003 | 3/1966 | Boudette et al. | 174/DIG. 5 |
| 3,350,915 | 11/1967 | Staffin | 165/104 X |
| 3,605,275 | 9/1971 | Enders | 34/57 A |
| 3,615,972 | 10/1971 | Morehouse et al. | 161/DIG. 5 |
| 3,632,703 | 1/1972 | Sullivan et al. | 161/DIG. 5 |

FOREIGN PATENTS OR APPLICATIONS

| | | | |
|---|---|---|---|
| 16,965 | 9/1963 | Japan | 174/17 SF |
| 578,869 | 7/1946 | United Kingdom | 174/17 SF |
| 860,105 | 2/1961 | United Kingdom | 165/104 |

*Primary Examiner*—Arthur Grimley
*Attorney, Agent, or Firm*—Michael Dunn; Jay P. Friedenson

[57] ABSTRACT

Method and apparatus for cooling and insulating high voltage electrical equipment. Method comprises bathing the equipment in a fluidized bed comprising an anhydrous particulate solid dielectric material preferably having an intrinsic dielectric strength greater than 100 kilovolts per cm. fluidized with a dielectric gas having an intrinsic dielectric strength of at least about 0.9 relative to dry air. Apparatus comprises a housing for holding a particulate solid dielectric, the housing having gas tight bottom and side walls, means for suspending a unit of high voltage electrical equipment in electrically insulated spaced relationship therewith, means for passing an electric current through said unit, an inlet for gas proximate the bottom of the housing, an outlet for gas at the top of the housing, an apertured plate disposed above the gas inlet, means for passing the gas at fluidizing velocity upwardly through the apertured plate, means for removing particulate solid dielectric from the housing, means for cooling the removed particulate solid dielectric and means for returning the cooled particulate solid dielectric to the housing.

28 Claims, 2 Drawing Figures

METHOD AND APPARATUS FOR COOLING AND INSULATING ELECTRICAL EQUIPMENT

CROSS-REFERENCE TO RELATED APPLICATIONS

This invention is a continuation-in-part of my co-pending application Ser. No. 318,301 filed Dec. 26, 1972 entitled "Method and Apparatus for Cooling and Insulating Electrical Equipment" now abandoned which is a continuation-in-part of my co-pending application Ser. No. 60,680, filed Aug. 3, 1970, entitled "Method and Apparatus for Cooling and Insulating Electrical Equipment."

BACKGROUND OF THE INVENTION

The expansion in the production and utilization of electrical energy has created the need to handle increasing amounts of electrical power at high voltages. High voltage is intended to mean a voltage of at least 8,000. Equipment designed to transmit and convert such high voltage energy from the generation sites to the distribution and consumption points operates with generation of relatively large amounts of heat which must be rapidly and efficiently dissipated.

Heretofore, electrical equipment, such as transformers, have been cooled and insulated by means of dielectric liquids, such as petroleum oils or halogenated hydrocarbons, or dielectric gases, such as sulfur hexafluoride, octafluoro-propane and the like. Use of such materials has not proven to be entirely satisfactory. Under the severe conditions prevalent during their use, e.g. temperatures often in excess of 85°C., the oils expand due to heat and can leak from around the transformer and in addition can decompose to flammable products which can give rise to catastrophic arcing and explosions; gases, such as sulfur hexafluoride and octafluoropropane, have proven ineffective to handle the higher amounts of heat generated by high power equipment, such as 10,000 KVA transformers, and air, because of its content of moisture and oxygen, tends to corrode the metal parts of the equipment it comes in contact with, especially under high temperature conditions.

In the prior art an attempt was made to reduce expansion of oils by adding a particulate material having a lower coefficient of expansion than the oil to reduce the adverse effects of expansion of oil. The addition of such particulate material; however, substantially reduced the dielectric strength of the oil and the dielectric strength rapidly approached zero if repeated breakdowns occurred.

An attempt was made to increase heat transfer by using a stream of gas carrying entrained particles of aluminum oxide trihydrate as the cooling and insulating medium. While the heat transfer was increased the breakdown voltage unexpectedly substantially decreased with use and any attempt to use other kinds of particles e.g. sand resulted in unacceptably high rates of abrasion.

SUMMARY OF THE INVENTION

I have discovered a novel method and apparatus for cooling and insulating electrical equipment which are efficient under high temperature and high voltage conditions which do not cause severe abrasion and which retain high dielectric strength even after repeated electrical breakdowns and extended use at operating temperatures of up to at least 85°C. The novel method is carried out by bathing the electrical equipment in a fluidized bed comprising certain anhydrous particulate solid dielectric materials fluidized with certain dielectric gases rather than using entrained particles. The dielectric gas should have an intrinsic dielectric strength of at least 0.9 relative to dry air.

The novel apparatus comprises a gas-tight housing having therein means for suspending a unit of electrical equipment in spaced relationship within the housing, means for passing an electric current through said unit, an inlet for gas at the bottom of the housing, an outlet for gas at the top of the housing, an apertured plate disposed above the gas inlet, and means for passing gas at fluidizing velocity upwardly through the apertured plate.

Circulation of the fluidized mixture of dielectric gas and anhydrous dielectric particulate solid material around the high voltage equipment results in a cooling capacity which is significantly greater than that obtained by using either the dielectric gas or the dielectric particulate solid material alone, yet at near atmospheric pressures the insulating effect of the mixture is unexpectedly almost as great as the dielectric gas alone and is unexpectedly as great or greater after repeated electrical breakdowns than a static mixture.

DETAILED DESCRIPTION OF THE INVENTION

Figure 1:
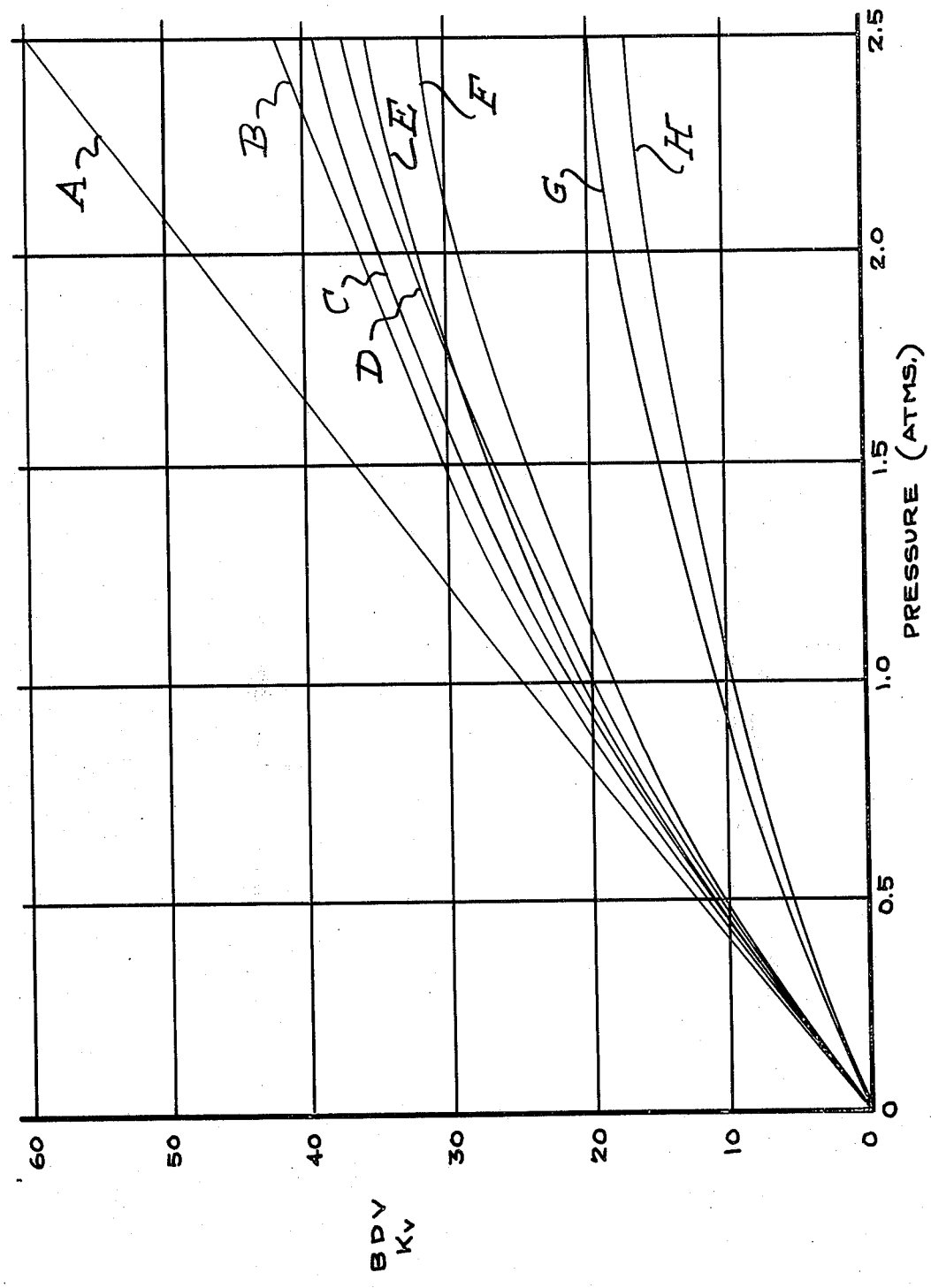
FIG. 1 is a graph showing the relationship of breakdown voltage to pressure for various fluidized bed systems.

The gaseous component of the fluidized bed serves at least two functions. Firstly, it provides dielectric strength, especially under start-up conditions and also maintains the insulating character of the bath in cases of failure of the fluidizing action, for example, due to pump failure. Secondly, the gas serves as the fluidizing medium for the solid component and assists with the heat transfer.

As used herein the term "dielectric" is meant to imply an insulator or non-conductor of electricity. An ideal dielectric allows only a brief transient flow of current which charges it electrostatically. This charge or displacement of electricity produces a counter emf (electromotive force) equal and opposite to the applied emf, and the flow of current ceases. It is recognized that some substances may be essentially non-conducting when the applied voltage is sufficiently low, or at ordinary temperatures, but become good conductors at higher applied voltages or higher temperatures. As used herein, therefore, the term "dielectric" is intended to define materials which are non-conductors under the conditions of use.

Any dielectric gas, or low boiling dielectric liquid which is convertible to the gaseous state under the temperature and pressure conditions of the process, and which is relatively stable, can be used as the gaseous dielectric component.

As will be apparent from the above discussions, a wide variety of dielectric gases are suitable for use in this process. Illustrative of suitable gases are sulfur hexafluoride, fluorocarbon gases such as tetrafluoromethane, perfluoroethane, octafluoropropane, perfluorocyclobutane; and gases such as nitrogen. Many other suitable substances of this character will readily occur to persons skilled in this art.

The fluidizing medium is a gaseous compound under use conditions, or is a mixture of gaseous compounds, including azeotropic mixtures. Preferably, the gaseous compound or mixture has a molecular weight of at least 28 since the higher the molecular weight, consistent with low boiling point, the easier the fluidization of the solid component occurs. Lower molecular weights also result in lower pressure drops and higher void fractions in the fluidized bed. As used herein, "molecular weight" is intended to apply to a single gas or the average molecular weight of a mixture of two or more gases.

The boiling or sublimation point of the gaseous component preferably should be at most 0°C. at use pressure to reduce the probability of arcing under winter conditions and to simplify "start-up" procedure.

The dielectric strength of the gaseous component of the fluidized mixture is at least about 0.9 (relative to the dielectric strength of air at atmospheric pressure and room temperatures) and is preferably above about 1.0 and most preferably above about 1.5. The higher the dielectric strength of the gas, the less likely arcing will occur at high voltages. The dielectric strength of atomospheric air is about 10,000 volts at 20°C. for 0.15 inch gap at atmospheric pressure.

Gases which are corrosive to the material of construction of the apparatus and/or electrical equipment and/or the solid dielectric component should not, of course, be used.

Sulfur hexafluoride is the preferred gaseous dielectric because of its high dielectric strength, 2.3 to 2.5 relative to air, its low ′ sublimation temperature (−63°C.), and its high specific heat and chemical stability.

In the instance of sulfur hexafluoride, the heat conductivity of a fluidized bed of this gas and alumina microspheres as the solid particulate dielectric material, for example, increases the heat transfer coefficient of the fluidized bed approximately five fold as compared with the gas alone, thus permitting such a composition to handle over five times the power which could be handled by sulfur hexafluoride alone.

The particulate solid component material of the fluidized bed likewise serves a double function. Together with the gaseous dielectric, the solid dielectric provides dielectric strength, or a non-conducting atomosphere, around the electrical equipment. The solid also serves primarily as the heat transfer medium. Because of the high surface area, which increases as the particulate size diminishes, the solid particles when in motion in their fluidized state, rapidly and efficiently transfer the heat generated by the electrical equipment from the surfaces thereof to the walls of the housing and from the walls of the housing heat is transferred to the surrounding atmosphere.

Table I illustrates the superior heat transfer capabilities of the fluidized bed heat transfer method as compared with previously known heat transfer methods. As shown in Table I, it has now been discovered that heat transfer in the electrically insulating fluidized bed of the invention is as much as eight times the rate obtained using previous heat transfer methods or apparatus for removing heat from high voltage electrical apparatus.

TABLE I

Maximum Heat Transfer Coefficients for Various Cooling Systems Watts per Square Inch per °C.

| Max. Coefficient | | |
|---|---|---|
| Air 1–3 atm | 0.012 | |
| Sulfur hexafluoride ($SF_6$) 1–3 atm | 0.013 | Natural Convection |
| Silicone Oil, 100 Centistokes | 0.11 | |
| Transformer Oil | 0.13 | |
| Air 1–3 atm | 0.11 | |
| $SF_6$ 1–3 atm | 0.19 | |
| Helium 1–3 atm | 0.22 | |
| Transformer Oil | 1.0 | Forced Convection |
| Polytetrafluoroethylene (TFE) round 800μ beads fluidized with $SF_6$ | 4.0 | |
| Glass round 200μ beads fluidized with $SF_6$ | 9.0 | |

As used in the table natural convection means that no pumping means is used to circulate the fluid in the system. Forced convection means that a pump or other circulating means is used to maintain a substantially even heat distribution throughout the system.

The solid component may have any shape and can be hollow, porous, or solid. A variety of suitable solid dielectric materials are commercially available in pellet, tablet, bead, ring, rod and similar shapes and are well suited for use in the process of the invention in these forms. Preferably this component should possess a smooth surface and be substantially spherical or substantially ellipsoidal in shape. The term "substantially spherical" is intened to exclude particles having points or edges and excludes particles having any radius deviating by more than 10% from the fradius of an ideal sphere. Similarly, "substantially elliposidal" excludes particles having points or edges, excludes particles having a radius which deviates more than 10% from a true ellipse and includes "substantially spherical." Optimum results will generally be obtained when the solid dielectric possesses a smooth spherical shape. The solid component should preferably be free of sharp edges which can abrade the unit being cooled, which can break off to give rise to ultrafine powder and which can cause non-uniform electrical fields. Microspheres having a diameter within the range of from about 50 to about 900 microns are preferred.

The most preferred particulate solid dielectric material is a particulate dielectric anhydrous oxide such as $SiO_2$ in the form of sand or glass or a plastic such as polytetrafluoroethylene which solid is chemically stable and solid at temperatures above about 85°C., preferably above about 150°C. and most preferably above about 200°C.

The surface of the particle should preferably not absorb or adsorb water since such water tends to decrease the dielectric strength.

As will be apparent, the melting point of the solid should be higher than the anticipated operating temperature of the unit. Preferably, solids mleting or softening at 500°C. and above should be used; however, a softening or melting point of 150°C. or above is suitable. "Softening point" as used herein means that the solid will change shape, other than by abrasion, under the forces applied during conditions of use encountered in the apparatus of this invention. Preferably, the solid material should have a volume resistivity greater than $10^9$ ohms-cm and preferably at least $10^{16}$ ohms-cm, and a dielectric strength preferably greater than 50,000 volts per cm at room temperature and more preferably 100,000 volts per cam at room temperature. Thermoplastic and thermosetting plastic materials such as acrylic polymers, cellulose acetate, epoxy resins, fluoroplastics, nylon, phenolic resins, polyethers, polycarbonates, polyesters, ethylene, polymers, propylene polymers, polysulfones, silicon resins, vinyl chloride polymers, and methyl pentene polymer have particularly high volume resistivities. Polytetrafluoroethylene, for example, has a volume resistivity greater than $10^{18}$ ohms, polysulfones have a volume resistivity greater than $10^{16}$ ohms and methyl pentene polymer has a volume resistivity of about $10^{16}$ ohms.

The dielectric constant of the material of the solid particles, which is a measure of force of attraction through the material between two electric charges, is preferably in the range of about 2 to about 5 at 60 hertz (cycles per second).

The dissipation factor, which is a measure of power loss in a dielectric subjected to an alternating electric field, should preferably be 0.010 or less at 60 cycles per second and more preferably should be less than 0.003 and most preferably should be less than 0.0005 to reduce power loss in the solid materials at standard conditions. Various thermosetting and thermoplastic polymers have particularly low dissipation factors. For example, polytetrafluoroethylene has a dissipation factor lower othan 0.0002 at 60 cycles per second (CPS), methyl pentene polymer has a dissipation factor of about 0.0007 at 60 CPS, phenylene oxide has a dissipation factor of about 0.0004 at 60 CPS, and polyethylene has a dissipation factor less than 0.0005 at 60 CPS.

A wide variety of particulate solid dielectric materials can be used. As typical of such materials, the following may be mentioned: glass, sand, ceramics, and thermosetting and themoplastic plastics, such as bakelite, acrylic resins; fluoroplastics, such as polytetrafluoroethylene and the like.

A preferred solid dielectric material is polytetrafluoroethylene in bead form which is not abrasive, has a high volume resistivity, is stable at temperatures above 300°C. and has a dissipation factor below 0.0005 which reduces electrical loss.

Another preferred solid dielectric material is silicon dioxide in the form of glass beads or sand since higher breakdown voltages are unexpectedly obtainable when silicon dioxide, particularly glass beads, is used.

The proportions of the gaseous and particulate solid dielectric components of the fluidized bed used in accordance with the invention are not critical and may be varied over a considerable range. As will be apparent, the gaseous component is pumped through the bed of the particulate solid component and fluidizes the mass of the solid component causing an increase in volume depending upon the gas velocity and the relative densities of the component materials. The optimum proportions will thus vary according to the conditions and may be determined in a particular instance by one or more routine trails.

Generally, the solid component should be present in an amount sufficient to cover at least 80% of the electrical item being cooled and insulated. Preferably, the amount should be such as to completely cover the item and leave a free space between the top of the item and the top of the housing of about 20% of the volume of the housing. The solid particulate mass, on being fluidized, should expand at least about 10% in volume and preferably enough so that all portions of the heat-generating electrical unit are covered by the fluidized mass.

Suitable gas velocities for fluidizing the solid particles are within the skill of the art since fluidized beds are commonly used for a variety of other purposes and the techniques and conditions for maintaining a fluidized bed of solid particles are well known. A discussion of the necessary gas velocities for fluidization may be found in the monograph appearing in *Chemical Processing*, December 1964, at page 86.

The fraction of voids, $\Sigma$, in a fluidized mixture is given by the equation $$\Sigma = 1 - W/LA\ (\rho\ \text{solid} - \rho\ \text{gas})$$

where,
$W$ = weight of solid component
$L$ = bed height to interface
$A$ = bed area
$\rho$ solid = density of solid component
$\rho$ gas = density of gaseous component For optimum heat transfer, it is desirable to operate under conditions of low void content and a low fluidizing gas velocity.

The low fluidizing velocity is also desirable in that it has been discovered that hard particles, e.g. glass or sand, can be used with very little detrimental abrasion provided that the gas velocity in the fluidized bed is lower than the terminal velocity of the particle. The terminal velocity is the gravitational settling velocity of the particle in a static atmosphere at the same pressure as the pressure found in the fluidized bed.

FIG. 1 of the drawings is a graph of breakdown voltage (BDV) in kilovolts for various gaseous and fluidized bed systems against absolute pressure in atmospheres (atms.) present in the fluidized bed system. The breakdown voltage is the root mean square average voltage rather than peak voltage (0.707 times peak voltage).

The breakdown voltage in kilovolts (Kv) is determined through a 0.15 inch gap using 0.75 inch diameter brass electrodes. The systems represented on the graph are shown in Table II as follows:

TABLE II

| CURVE | SYSTEM |
|---|---|
| A. | Pure sulfur hexafluoride ($SF_6$) gas |
| B. | round glass beads having an average particle size of about 200 microns fluidized with $SF_6$ gas |
| C. | angular fused silica particles having an average particle size of about 400 microns fluidized with $SF_6$ gas |
| D. | round polyethylene beads having an average particle size of about 400 microns fluidized with $SF_6$ gas |
| E. | round polytetrafluoroethylene beads having an average particle size of about 800 microns fluidized with $SF_6$ gas |
| F. | angular polytetrafluoroethylene (TFE) particles having an average particle size of 450 microns |

TABLE II-Continued

| CURVE | SYSTEM |
| --- | --- |
| G. | fluidized with $SF_6$ gas<br>AIR |
| H. | round glass beads having an average particle size of 200 microns fluidized with air |

The graph clearly illustrates the unexpected discovery that the $SF_6$ fluidized bed system has a breakdown voltage at atmospheric pressure almost as high as the dielectric gas alone. In addition, the graph illustrates the unexpected discovery that the glass bead - sulfur hexafluoride ($SF_6$) fluidized bed system has a breakdown voltage about 20% greater than the other fluidized bed systems tested even at pressures as high as 2.5 atmospheres. The breakdown voltage for the glass bead - $SF_6$ fluidized bed system is unexpectedly about 23 kilovolts at atmospheric pressure, about 36 kilovolts at 2 atmospheres of pressure and over 40 kilovolts at 2.5 atmospheres of pressure.

The graph shown in FIG. 1 further illustrates that rounded or spherical particles permit higher breakdown voltages to be achieved than is possible when irregular or angular shaped particles are used.

Table III illustrates the unexpected stability of the novel fluidized bed system. The breakdown voltage in kilovolts is determined through a 0.10 inch gap using 0.75 inch diameter brass electrodes. Each system is heated to 85°C. for 6 hours prior to determining breakdown voltage to simulate temperature conditions encountered in actual cooling of high voltage equipment. Table III shows the fluid used, the solid particle used, the type of system and the breakdown voltage of each of five successive breakdowns. The breakdown voltages evidence the advantage of using anhydrous particulate solid component in accordance with the invention and evidence the unexpected property of the electrical stability of the fluidized bed system when subjected to repeated electrical breakdowns.

and hence sharp points in the solid dielectric and/or electrical equipment which create a non-uniform field are to be avoided.

Accordingly, the optimum dimensions of the apparatus will depend upon the dielectric strength of the gas, the configuration and the nature of the solid particles, the operating temperature of the electrical unit and the amount of heat to be dissipated. The latter is a function of the dissipation factor or loss tangent of the solid materials under operating frequencies.

The free space in the housing, that is the space between the electrical unit being cooled and insulated and the walls of the housing or enclosure should be sufficient to permit free and ready passage of the fluidizing mixture around the electrical unit. In general, this free space will amount to at least about 20% of the volume of the housing or enclosure and preferably about 25% of the volume of the housing. Preferably, the electrical unit should be centered in the housing to provide uniformity in the free space around the unit.

Figure 2:
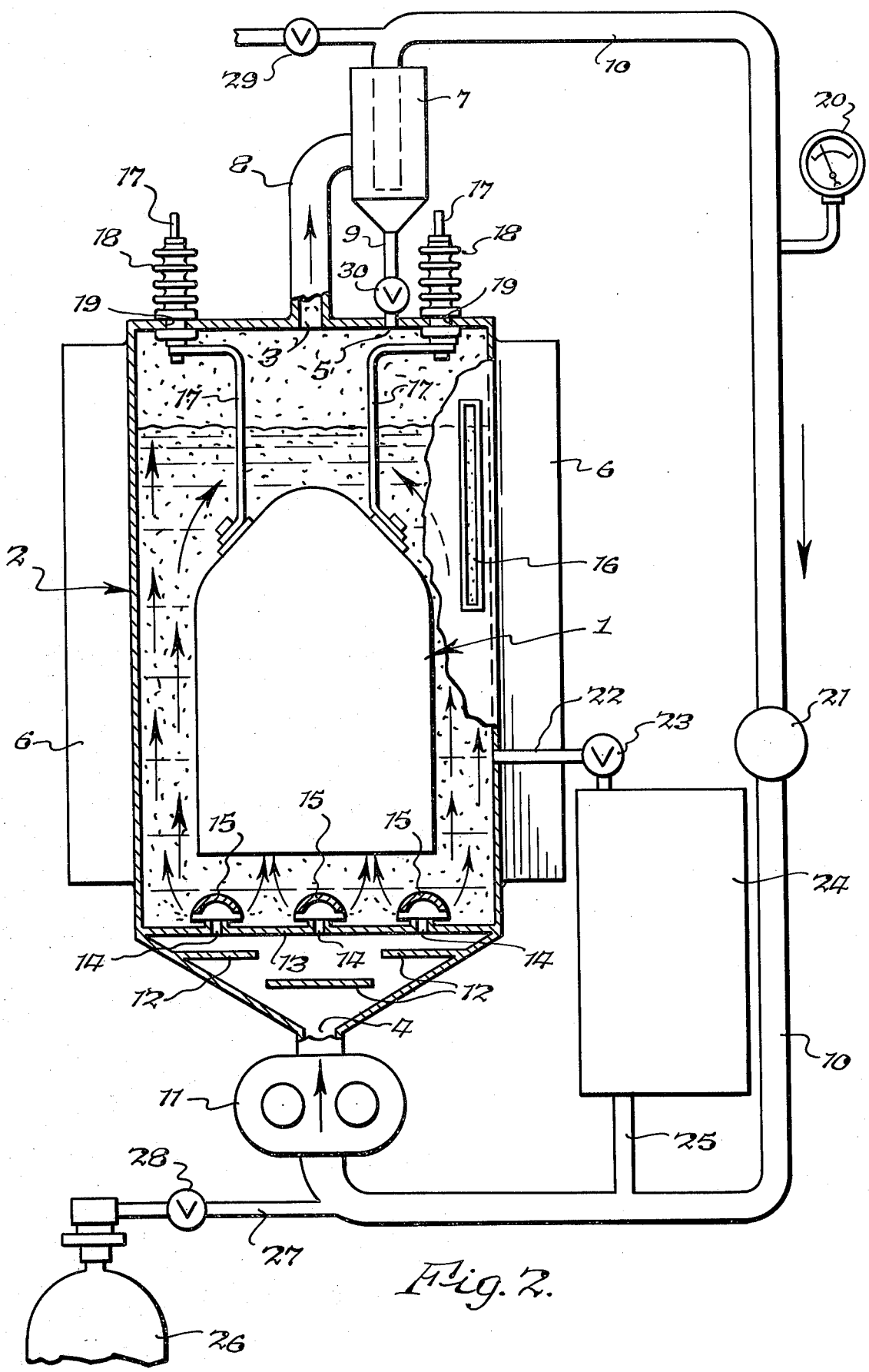
FIG. 2 is illustrative of a preferred embodiment of the apparatus of the invention, and shows an electrical unit mounted within a gas-tight housing including means for maintaining a fluidized bed of dielectric materials around the unit and means for recirculating dielectric materials back to the bed.

FIG. 2 illustrates the application of the present invention to the cooling and insulation of a conventional high voltage transformer. As indicated thereon, a transformer 1 which is to be cooled and insulated is suspended within gas-tight housing 2 having a gas outlet 3 which is located in the top of housing 2 but may have another location in the upper portion of the housing, a gas inlet 4 which may be located either in the top, bottom or sidewall of housing 2, and a solids inlet 5. The transformer which is 4 feet in its longest dimension and at the base is 3 feet by 3 feet, is positioned in the housing so that the base is about 1 foot from the apertured plate, and the highest point of the transformer is about 2 feet from the top of the housing. The sides of the transformer are about 6 inches from the sides of the housing thereby permitting free passage of the fluidized mixture around the transformer. The top of the transformer may have a sufficient downward pitch to prevent accumulation of particles on the top of the transformer. The housing is optionally provided with fins 6 to assist in the transfer of heat from the housing to the

TABLE III

| FLUID | SOLID | TYPE OF SYSTEM | SUCCESSIVE BREAKDOWN VOLTAGES IN KILOVOLTS | | | | |
| --- | --- | --- | --- | --- | --- | --- | --- |
| | | | 1 | 2 | 3 | 4 | 5 |
| Transformer Oil | None | Static | 42 | 43 | 44 | 44 | 42 |
| Transformer Oil | 200–400$\mu$ glass beads | Static | 21 | <2 | <2 | <2 | <2 |
| $SF_6$ | Polytetrafluoroethylene beads | Static | 13 | 12 | 11 | 9 | 6 |
| $SF_6$ | Polytetrafluoroethylene beads | Fluidized | 13.3 | 13.3 | 13.3 | 13.3 | 13.3 |
| $SF_6$ | 200–400$\mu$ glass beads | Static | 16 | 16 | 16 | 16 | 16 |
| $SF_6$ | 200–400$\mu$ glass beads | Fluidized | 16 | 16 | 16 | 16 | 16 |
| $SF_6$ | Aluminum Oxide Trihydrate | Static | 5.0 | 5.5 | 5.5 | 5.0 | 5.0 |
| $SF_6$ | Aluminum Oxide Trihydrate | Fluidized | 7.6 | 7.6 | 7.6 | 7.6 | 7.6 |

The apparatus of the invention is designed to satisfy two main criteria: (1) electrical breakdown must not occur, and (2) the fluidized bed should operate to provide good heat transfer. Electrically, the gap distance between the high and low voltage points must be sufficient to prevent breakdown under the field conditions which exist in the equipment. Uniform fields, since they provide predictable results, are preferred. For example, a ball to plane configuration will result in breakdown at a higher voltage than a point to plane configuration surrounding atmosphere. Separator 7, for removing solids from the gas stream exiting outlet 3, is located outside housing 2 and is connected to housing 2 by means of conduit 8 which communicates with outlet 3. Solids return pipe 9 connects separator 7 with housing 2. Gas recirculating pipe 10 which is a hollow conduit extends from the top of separator 7 through pump 11 to gas inlet 4. Baffles 12 in the bottom of housing 2 serve to distribute gas supplied from pump 11 across the bottom of plate 13 having apertures 14. Solid particles are prevented from falling back through apertures 14 by half cylindrical pipe sections or shield members 15. Window 16 in housing 2 permits visual observation of the fluidized bed. Connection of transformer 1 to an outside power source is made by electrical leads 17 which are mounted with ceramic insulators 18 and pass through access openings 19 into housing 2. Gas recirculating pipe 10 may optionally contain pressure gauge 20 and flow meter 21 to monitor the flow of gas therethrough. A first hollow conduit 22 may optionally be connected to the interior of housing 2 to remove heated solid particles from housing 2 through conduit 22 and control valve 23 to heat exchanger 24 where the particles are cooled before being returned through a second hollow conduit 25 to recirculating pipe 10 and through recirculating pipe 10 to inlet 4.

The apparatus further comprises anhydrous particulate solid (particles) within the housing which particulate solid is preferably made of a material having a volume resistivity of above about $10^{16}$ ohm per centimeter, a breakdown voltage greater than 100 volts per mil, a dissipation factor less than 0.01 and an average particle size less than 900 microns.

Sulfur hexafluoride is fed at a slow rate from cylinder 26 through pipe 27 and valve 28 into gas recirculating pipe 10 through pump 11 into housing 2 until the air originally in housing 2 is displaced. The displaced air exits housing 2 through outlet 3 and is vented to the atmosphere through valve 29 after passing through separator 7. Thereafter the particles are fluidized by pumping $SF_6$ gas through inlet 4 at a velocity within the range of from 0.5 to 3 ft/sec. The gas flow is adjusted so that the volume occupied by the bed in the housing increases by about 5 to 10% over its initial volume. The $SF_6$ gas passing through the bed of solid dielectric particles causes fluidization and the fluidized particles pass over and around the transformer in heat exchange relationship therewith. Gas containing entrained particles exit from the housing through outlet 3 into separator 7 where the solid particles are separated from the gas stream and are returned at desired intervals through valve 30 to housing 2 through access opening 5 by gravity. The $SF_6$ gas passes from the separator 7 through gas recirculating pipe 10 to pump 11 and back into housing 2 thereby completing the cycle. Entrained particles may be intentionally removed through conduit 22 and valve 23 and passed through a heat exchanger 24 to remove heat from the particles before they are returned to housing 2 through tube 25, flow meter 21 and recirculating pipe 10, thus increasing cooling efficiency.

The fluidized dielectric mixture passes in heat transfer relationship with the sides of housing 2 which are cooled by the surrounding atmosphere, assisted by the fins 6. Additional cooling may be provided, if desired, by conventional means along gas recirculating pipe 10 to cool the circulating dielectric gas as it passes from the separator 7 back into housing 2.

Variations and modifications may be made to the above-identified apparatus and process without departing from the scope or spirit of my invention, as will be obvious to those skilled in this art.

What is claimed is:

1. A method for cooling and insulating high voltage electrical equipment which comprises bathing said high voltage electrical equipment in a fluidized bed comprising a particulate solid dielectric material, which is a dielectric anhydrous oxide or a plastic, said particulate solid dielectric material being chemically stable and solid at a temperature of about 150°C. and which is fluidized with a dielectric gas.

2. The method as described in claim 1 wherein the fluidizing dielectric gas has a velocity below the terminal velocity of the particulate solid.

3. The method of claim 2 wherein said solid particulate dielectric material has an intrinsic dielectric strength greater than 100 kilovolts per centimeter.

4. The method of claim 2 wherein said electrical equipment is a high voltage transformer.

5. The method of claim 2 wherein the gaseous dielectric has a molecular weight of at least 28.

6. The method of claim 5 wherein the gaseous dielectric has a boiling or sublimation point not exceeding about 0°C. at one atmosphere.

7. The method as described in claim 3 wherein the gaseous dielectric has a dielectric strength within the range of about 1.5 to 2.5 relative to dry air.

8. The method as described in claim 3 in which the gaseous dielectric is sulfur hexafluoride.

9. The method as described in claim 3 in which the particulate solid dielectric has a smooth surface and is substantially elliposidal in shape.

10. The method as described in claim 9 in which the particulate solid dielectric is substantially spherical in shape.

11. The method as described in claim 10 wherein the solid dielectric particles have a diameter within the range of from about 50 to about 900 microns.

12. The method as described in claim 3 in which the particulate solid dielectric has a volume resistivity greater than $10^9$ ohm/cm.

13. The method as described in claim 9 in which the dissipation factor of the solid dielectric at 60 cycles per second is 0.01 or less.

14. The method as described in claim 13 in which the dissipation factor of the solid dielectric at 60 cycles per second is 0.0005 or less.

15. The method as described in claim 3 wherein the particulate solid can withstand a continuous temperature of at least 300°C.

16. The method as described in claim 13 wherein the fluidizing dielectric gas is under a pressure of about 2 atmospheres.

17. The method as described in claim 8 wherein the particulate solid is polytetrafluoroethylene.

18. The method as described in claim 8 wherein the particulate solid is glass beads.

19. The method as described in claim 8 wherein the particulate solid is sand.

20. Apparatus for cooling and insulating high voltage electrical equipment which comprises:
   a. a gas-tight housing;
   b. means for suspending a unit of high voltage electrical equipment within said housing and in spaced relationship therewith;
   c. means for sending an electric current through said unit;
   d. an inlet for gas at the bottom of said housing;
   e. an outlet for gas in the upper portion of said housing;
   f. an apertured plate disposed above the gas inlet;
   g. means for passing a gas at fluidizing velocity upwardly through said apertured plate; and
   h. a particulate solid within the housing having a volume resistivity of at least $10^{16}$ ohms-cm., a breakdown voltage greater than 50,000 volts per cm., a dissipation factor less than 0.01 and an average particle size less than 900 microns.

21. Apparatus according to claim 20 which includes means for recirculating gas exiting from the gas outlet back into said housing through the gas inlet.

22. Apparatus according to claim 20 which includes means for removing entrained solids from the gas exiting the gas outlet and returning the same to within the housing.

23. Apparatus according to claim 21 which includes a unit of high voltage electrical equipment suspended within the housing in spaced relationship therewith.

24. Apparatus according to claim 23 in which the electrical equipment is a high voltage transformer.

25. The apparatus as defined in claim 23 where said apparatus is provided with means for removing particles contained within said housing, means for cooling said removed particles and means for returning the cooled particles to said housing.

26. An apparatus as defined in claim 25 wherein said means for removing particles is a first hollow conduit connected to the interior of said housing.

27. An apparatus as defined in claim 26 wherein said cooling means is a heat exchanger connected to said first hollow conduit.

28. An apparatus as defined in claim 27 wherein said returning means is a hollow conduit connected from the heat exchanger to the gas inlet.

* * * * *